United States Patent Office 3,114,725
Patented Dec. 17, 1963

3,114,725
COATING COMPOSITIONS
Herbert A. Kaufman, Jr., North Chicago, and Richard E. Caplan, Waukegan, Ill., assignors to Midland Industrial Finishes Co., Waukegan, Ill., a corporation of Illinois
No Drawing. Filed Apr. 4, 1963, Ser. No. 270,526
13 Claims. (Cl. 260—32.8)

This invention relates to coating compositions and metal surfaces coated therewith.

This application is a continuation-in-part of our allowed application Serial No. 771,960, filed November 5, 1958.

Our coating compositions are particularly well suited for coating the interior metal surfaces of containers and container parts and closures, for foods and beverages, as well as products intended for household or industrial use, such as liquid detergents. For example, our coating compositions may be used for packaging acidulous products such as mayonnaise and pickles as well as liquid alkaline detergents, which products encompass a broad pH range.

Extensive research has been conducted for many years in an effort to meet the stringent requirements of sanitary coatings suitable for food and beverage containers and parts and closures for containers, and improve the formulation of such coatings. Such coatings should adhere tenaciously to the underlying metal surface of the container and possess superior abrasion or mar resistance. Further, the coating composition should not deleteriously affect the contents of the container. The coating, for example, should be free from harmful toxic or flavor conferring constituents and have a high degree of stability towards organic esters and acids, fats and greases, alcohols, dilute inorganic acids, alkalies, and other constituents that may be present in the packaged products.

When coating compositions are used to line containers used for packaging products such as liquid detergents, they must not harm the detergent and vice versa. Still further, the coating must be able to withstand the processing steps used in preparing the finished packaged product. For example, when foods such as soup are packaged in the container, the sealed container is subjected to a sterilizing treatment during which the container is subjected to hot water or steam over a prescribed period (e.g., about 10 minutes to many hours). The coating should also be capable of withstanding forming and bending operations used in fabrication. Still further, the coating composition should be economical to use, capable of being readily applied to metal surfaces, and capable of being readily formed into containers having the above-discussed properties to a satisfactory degree.

It can be readily seen that the foregoing requirements for coatings are very demanding. Therefore, the coating industry is in continuous search for discovering or developing coating compositions which satisfy these prerequisites to an optimum degree.

We have discovered coating compositions that possess the above-mentioned requirements of sanitary coatings to a high order and, in addition, have properties that are ideally suited for packing materials (e.g., industrial as well as household products) other than food or beverage products.

Our invention obviates the need for a primer coating, affords greater coating protection per unit weight of coating than other conventional coatings that have been used in conjunction with a primer, and has an extensive range of uses. The compositions of this invention have excellent adherence properties with respect to unprimed metal surfaces and at the same time have outstanding resistance characteristics.

Prior to our discovery of the invention, the metal coating industry was unable to effectively utilize the high resistance (resistance to the product packaged) properties of an organosol and still obtain good fabricating properties without suitably priming the metal surface to be coated.

The liquid coating compositions, as applied to the surfaces to be coated, embraced by this invention contain the following components:

(a) An organosol dispersion component having vinyl chloride dispersion resin;
(b) A solution grade vinyl chloride copolymer component (e.g., vinyl chloride-vinyl acetate and/or vinyl chloride-lower alkyl maleate);
(c) A non-oil-modified, alkaline-condensed, heat-hardenable trifunctional phenol-aldehyde resinoid component;
(d) A liquid vehicle (e.g., dispersant and/or diluent or solvent); and, if desired,
(e) A pigment (including a blend of several pigments).

These coating compositions may be baked-on the coated metal surfaces.

The term "organosol" herein refers to compositions that contain vinyl chloride polymer and volatile dispersing liquid and/or diluent. The organosol should contain a heat stabilizer and may contain a plasticizer.

It is essential that each of the components (a)–(d), supra, be present in effective quantities in our liquid coating composition. Liquid coating compositions containing each of (a)–(d) have better adhesion properties, chemical resistance, stability and wear properties than coating compositions containing: (a), (b) and (d); or (b), (c) and (d).

Our liquid coating compositions may be stored, prior to their application to metal surfaces, as either a single or two-unit system, and the two-unit system may be later admixed to form a single system. When a two-unit system is used, for example, one of the units contains the organosol component and the second unit contains a solution grade vinyl chloride copolymer component plus the phenol-aldehyde resinoid component; the pigment(s) may be present in either one or both of the units. When the coating composition is to be applied to metal surfaces, the two units should be admixed to form the final, single unit system. However, it is desirable not to admix the two units more than about 24–48 hours prior to the application of the coating composition to the container so as to obviate solvation and an accompanying increase in viscosity. High storage temperatures accelerate solvation and rapidly cause an increase in viscosity. Although solvation and an increase in viscosity may result from extensive storage, this may be satisfactorily overcome by the addition of diluent and/or dispersant. On the other hand, a single unit system may be formed, initially, prior to its application to the metal surfaces. In the single unit system, a negligible build-up in viscosity occurs when the ingredients and proportions are properly selected.

The oragnosol dispersion component is a dispersion of a polyvinyl chloride resin and, in addition to the resin, contains a diluent and/or dispersant. The suspended vinyl chloride resin in the organosol component contains a finely-divided polymerized (e.g., emulsion or suspension polymerized) polymer of vinyl chloride. A stabilizing agent that inhibits thermodecomposition should also be used in conjunction with the organosol component. The stabilizing agent may be present in the organosol component or later combined therewith in the preparation of the final liquid composition. When controlled levels (about 0–2% by weight based on total solids) of blue lead sulfate pigment are present in the final liquid coating compositions, it will serves as a stabilizer as well as a pigment. In addition, if desired, a suitable plasticizer may be present in or added to the organosol component. It is desirable also to include in the organosol component, or later combine therewith, a modifier, such as a vinyl chloride-vinylidene chloride copolymer, vinyl chloride-maleate copolymer, or a vinyl chloride-vinyl acetate copolymer, which are solution grade resins, in order to improve adhesion and lower the fusion temperature, of the final coating composition.

We have found that excellent results are obtained when the organosol component contains a vinyl chloride resin containing essentially vinyl chloride resins as such and having an average molecular weight above about 20,000.

Commercially available vinyl chloride homopolymer dispersion resins such as the following may be used in the organosol component: "Marvinol VR–50," a solid dispersion grade, stir-in type polyvinyl chloride having a specific gravity of 1.4, an average particle size of 1.7 microns, and a specific viscosity of 0.50; "Opalon 440," a solid dispersion grade, stir-in type polyvinyl chloride having a specific gravity of 1.4, an average particle size of less than 1 micron, and a specific viscosity of 0.54–0.57; "Bakelite QYNV," a white powdered solid containing at least about 98% by weight polyvinyl chloride, and having a specific gravity of about 1.40 and a specific viscosity from about 0.240 to 0.32 as measured by 0.2 gm. resin per 100 ml. of nitrobenzene at 20° C.; "Opalon 410," a dispersion grade polyvinyl chloride of a stir-in type having the following properties: consistency—powder, color—white, specific gravity—about 1.40, specific viscosity (solution of 0.40 gm. of polymer in 100 ml. of cyclohexanone at 25° C.)—about 0.53–0.55, particle size—1–2 microns, dry bulk density—about 0.25–0.35 gm./cc., loss in weight on heating—about 0.5% max., ash—about 0.5% max.; "Geon 121," a stir-in type high molecular weight polyvinyl chloride resin in the form of a fine white powder, has a specific gravity of about 1.4, a bulk density of about 20–25 lbs./ft.$^3$, and a specific viscosity of about 0.57–0.63; and "Exon 654," a high molecular weight dispersion type polyvinyl chloride (white powder) product having a specific gravity of about 1.4 and average relative viscosity of about 2.65.

The vinyl chloride homopolymer dispersion resin may include some minor amount of another resin as a part thereof; however, the resin must include at least 95–96% by weight, preferably at least 98% or more by weight, of polyvinyl chloride.

The organosol component contains a liquid vehicle (diluent and/or dispersant) such as exemplified by aromatic hydrocarbons (e.g., toluol and xylol), ketones (e.g., methyl ethyl ketone, methyl isobutyl ketone, diacetone alcohol, isophorone, diisobutyl ketone), and glycol ethers (e.g., butyl Carbitol and diethylene glycol monoethyl ether). The aromatic hydrocarbons serve as diluents. The ketones serve as dispersants. The glycol ethers have properties of both the diluents and dispersants.

The organosol component should contain or be used in conjunction with a stabilizer. An epoxy resin may be used such as "Bakelite ERL–2774." "Bakelite ERL–2774" is a low molecular weight epoxy resin in the form of a viscous liquid and has a specific gravity of about 1.15–1.17, a color (Gardner 1933 Standard) of 10 (max.), an epoxide equilavent of about 185–200, and is soluble (clear to light haze) in aromatics, ketones, and alcohols but settles out in aliphatics.

The organosol component may also contain a plasticizer such as "Paraplex G–62." This plasticizer product is a high molecular weight epoxidized oil having a molecular weight (average) of about 1000, a color (Gardner Varnish Scale) of 2 (max.), a specific gravity (25° C./15° C.) of about 0.999, a density of about 8.3 lbs. per gallon, a viscosity (poises, 25° C.) of about 3 to 4, a refractive index ($N_D^{25°}$) of about 1.471, a freezing point of about +2° C., a flash point (° C.) of about 316, an acid number (mgs. KOH/gm.) of about 1 (max.), and a saponification number (mgs. KOH/gm.) of about 182.

The organosol component may also contain or be used with a solution grade modifier (e.g., vinyl chloride-vinyl acetate copolymer modifier, vinyl chloride-vinylidene chloride copolymer modifier, and vinyl chloride-maleate copolymer modifier). The following commercially available vinyl chloride solution grade copolymer modifiers, for example, may be used: "Bakelite VMCH"; "Exon 470"; "Geon 400–X–110"; "Bakelite VYHH"; and "Bakelite VMCC." "Geon 222" may be used as the vinyl chloride-vinylidene chloride modifier. These modifiers may be more specifically identified as follows: "Bakelite VMCH" is a white, powdered solid containing a solvent polymerized vinyl chloride-vinyl acetate copolymer with a chemical composition of about 85.0 to 88.0% by weight of vinyl chloride, about 11.0 to 14.0% by weight vinyl acetate, about 0.8 to 1.2% by weight maleic acid, and having a specific viscosity from about 0.536 to 0.567 as measured by 1.0 gm. resin per 100 ml. of solution in methyl isobutyl ketone at 20° C.; "Exon 470" is a solution grade vinyl chloride copolymer comprising a major amount of vinyl chloride and a minor amount of a one-half lower alkyl alcohol ester of maleic acid or maleic anhydride (granular powder), and is disclosed and claimed in Rowland et al. Patent 2,731,449, reissued as Reissue Patent 24,206, and has a specific gravity of about 1.31, a bulk density (dry) of about 0.8 gm./cc., a bulk density (solution) of about 0.091 gal./lb., and a relative viscosity (1% in cyclohexanone) of about 1.35; "Geon 400–X–110" is a vinyl chloride-vinyl acetate copolymer having about 91%±2% vinyl chloride, about 6%±2% vinyl acetate and about 3%±2% maleic acid, and is a white powder reported to have a specific viscosity (at 20° C.) of 0.24, a tensile strength of (2 mil film) 6500, and 22–26% maximum working solvents; "Bakelite VYHH" contains about 87% by weight vinyl chloride and about 13% by weight vinyl acetate and has an intrinsic viscosity of about 0.50–0.55 measured in cyclohexanone at 20° C. "Bakelite VMCC" contains about 62% by weight vinyl chloride and about 38% vinyl acetate, and has an intrinsic viscosity (cyclohexanone at 20° C.) of about 0.28 and a specific gravity of about 1.30; and "Geon 222," a copolymer of vinyl chloride and vinylidene chloride in proportions of about 26–44.5% by weight vinylidene chloride, has a chlorine content of about 61–64% by weight, and has a specific viscosity of about 0.15–0.30 determined at 20° C. in 0.4 solution of nitrobenzene.

The solution grade vinyl chloride copolymer component may be vinyl chloride-vinyl acetate and/or vinyl chloride-lower alkyl maleate. The preferred solution grade vinyl chloride-vinyl acetate copolymer component for purposes of the invention are commercially available products such as follows: "Bakelite VMCH"; and "Bakelite VYHH." "Exon 470" is our preferred vinyl chloride-maleate solution grade copolymer. These products are identified above.

The non-oil-modified, alkaline-condensed, heat-hardenable trifunctional phenol-aldehyde resinoid component should contain about 1 to 4, preferably about 1.5 to 3, parts by weight formaldehyde, or an equivalent level of material that yields formaldehyde, for each part by weight phenol. We prepare the resinoid component with a non-oil-modified, trifunctional, nonsubstituted phenol, and prefer to use either formaldehyde or paraformaldehyde; such compositions have been found to provide the greatest adhesion and resistance properties to the final baked-on composition.

If desired, pigments such as titanium dioxide may be incorporated into the coating composition. The pigments may be incorporated into the coating composition in conjunction with the organosol component and/or the vinyl chloride solution grade copolymer component.

As pointed out above, some liquid dispersant and/or diluent is present in the organosol as such. However, additional liquid vehicle is ultimately incorporated into the final, single unit, liquid coating composition. When a two-unit system is used, some liquid vehicle (e.g., isophorone, diacetone alcohol, methyl ethyl ketone, xylol, etc.) may be present in the unit containing the phenol-aldehyde component and vinyl chloride-vinyl acetate solution grade copolymer component.

In preparing the organosol component, the vinyl chloride resin, as well as the vinyl chloride-vinyl acetate, copolymer modifier, vinyl chloride-maleate copolymer modifier, and vinyl chloride-vinylidene chloride copolymer modifier, may be dispersed in a predetermined solvent blend of diluent and dispersant. The pigment, stabilizer and plasticizer may then be added to the dispersion. The resulting organosol composition may be charged into suitable milling equipment, such as disclosed in U.S. Patent 2,581,414, in order to effect further grinding and/or dispersion of the constituents.

The solution grade vinyl chloride copolymer component from the group consisting of vinyl chloride-vinyl acetate and vinyl chloride-lower alkyl maleate, and the trifunctional, heat-hardenable, phenol-aldehyde resinoid component may be dissolved in a solvent blend, such as a mixture of ketones and aromatic hydrocarbons, until they are completely dissolved. If pigmentation is desired, a pigment may be added as a prepared dispersion (e.g., "Bakelite VMCH," TiO₂ plus ketone); for example, the pigment may be dispersed in one or more of the liquid vehicles ultimately present in the final liquid coating composition.

In a two-unit system, the unit containing the pigmented solution grade vinyl chloride copolymer component and the trifunctional, heat-hardenable phenol-aldehyde resinoid component may be combined with the unit containing the organosol component to produce the completed liquid coating composition.

Table I, infra, illustrates various proportions of constituents that may be used in producing a satisfactory liquid coating composition having about 35–70% by weight nonvolatile materials.

TABLE I

Non-volatile heat-hardenable phenol-aldehyde
   resinoid_____percent by weight__ 0.5–20
Non-volatile vinyl chloride dispersion
   resin_____percent by weight__ 10–50
Non-volatile vinyl chloride copolymer solution
   grade resin _____percent by weight__ 5–35
Non-volatile pigment_____do____ 0–25
Non-volatile stabilizer_____do____ 1–10
Non-volatile plasticizer_____do____ 0–15
Liquid vehicle_____do____ 30–65
   Glycol ether_____percent__ 0–20
   Aromatic hydrocarbon_____do____ 0–65
   Ketone _____do____ 0–65

Table II, infra, illustrates various proportions of constituents that may be used in preparing a preferred liquid coating composition having about 40–70% by weight nonvolatile materials.

TABLE II

Non-volatile heat-hardenable phenol-aldehyde
   resinoid_____percent by weight__ 1–5
Non-volatile vinyl chloride dispersion resin
                      percent by weight__ 15–40
Non-volatile vinyl chloride copolymer solution
   grade resin_____percent by weight__ 8–15
Non-volatile pigment_____do____ 0–15
Non-volatile stabilizer_____do____ 1–5
Non-volatile plasticizer_____do____ 0–5
Liquid vehicle_____do____ 30–60
   Glycol _____percent__ 0–12
   Aromatic hydrocarbon_____do____ 0–35
   Ketone _____do____ 0–60

Examples I–III, infra, illustrate two-unit systems that are later admixed to form suitable liquid coating compositions. In these examples, "Opalon 440" or "Marvinol VR–50" may be substituted for "Bakelite QYNV."

*Example I*

|  | Percent By Weight of Admixture of Units A and B | Percent By Weight Non-Volatile Material in Admixture of Units A and B |
|---|---|---|
| Unit A: |  |  |
|   "Exon 470"......................... | 2.575 | 5.80 |
|   "Bakelite QYNV"................... | 18.000 | 40.81 |
|   "Bakelite ERL–2774"............... | 2.325 | 5.30 |
|   Butyl Carbitol...................... | 4.075 | ............ |
|   "Penola 150" ¹ (aromatic hydrocarbon)....... | 13.250 | ............ |
|   Diisobutyl Ketone.................. | 3.675 | ............ |
|   Pigment (TiO₂).................... | 6.100 | 13.80 |
| Unit B: |  |  |
|   "Bakelite VMCH"................... | 8.600 | 19.49 |
|   Methyl Ethyl Ketone............... | 5.000 | ............ |
|   Isophorone......................... | 9.500 | ............ |
|   Diacetone Alcohol.................. | 7.000 | ............ |
|   Xylol............................... | 13.000 | ............ |
|   Trifunctional, Heat-Hardenable, Phenol-Aldehyde Resinoid Component (Product of Example VII)........... | 1.500 | 2.60 |
|   Pigment (TiO₂).................... | 5.400 | 12.20 |

¹ Product having 94% by volume aromatics (ASTM D 875), a mixed aniline point (° C.) 20, a flash point (Tag closed cup, ° F.) 150, a Kauri-Butanol value of 89.1, and a specific gravity (60/60° F.) of 0.8925.

*Example II*

|  | Percent By Weight of Admixture of Units A and B | Percent By Weight Non-Volatile Material in Admixture of Units A and B |
|---|---|---|
| Unit A: |  |  |
|   "Bakelite VMCH"................... | 2.575 | 5.90 |
|   "Bakelite QYNV"................... | 18.000 | 41.4 |
|   "Bakelite ERL–2774"............... | 2.325 | 5.30 |
|   Butyl Carbitol...................... | 4.075 | ............ |
|   "Penola 150" ¹ (aromatic hydrocarbon). | 13.250 | ............ |
|   Diisobutyl Ketone.................. | 3.675 | ............ |
|   Pigment (TiO₂).................... | 5.150 | 11.80 |
|   "Paraplex G–62"................... | 0.950 | 2.20 |
| Unit B: |  |  |
|   "Bakelite VMCH"................... | 8.000 | 18.40 |
|   Methyl Ethyl Ketone............... | 5.000 | ............ |
|   Isophorone......................... | 9.500 | ............ |
|   Diacetone Alcohol.................. | 7.000 | ............ |
|   Xylol............................... | 13.000 | ............ |
|   Pigment Component (TiO₂)....... | 5.400 | 12.40 |
|   Trifunctional, Heat-Hardenable Phenol-Aldehyde Resinoid Component (Product of Example VII)........... | 1.500 | 2.60 |

¹ Product having 94% by volume aromatics (ASTM D 875), a mixed aniline point (° C.) 20, a flash point (Tag closed cup, ° F.) 150, a Kauri-Butanol value of 89.1, and a specific gravity (60/60° F.) of 0.8925.

Example III

|  | Percent By Weight of Admixture of Units A and B | Percent By Weight Non-Volatile Material in Admixture of Units A and B |
|---|---|---|
| Unit A: |  |  |
| "Geon 222" | 2.60 | 5.80 |
| "Bakelite QYNV" | 17.90 | 40.2 |
| "Bakelite ERL-2774" | 2.30 | 5.20 |
| "SC Solvent 150" [1] | 15.40 |  |
| Diisobutyl Ketone | 3.70 |  |
| Butyl Carbitol | 4.10 |  |
| Pigment (e.g., $TiO_2$) | 6.10 | 13.6 |
| Unit B: |  |  |
| "Bakelite VYHH" | 2.10 | 4.80 |
| "Bakelite VMCH" | 6.70 | 15.0 |
| Xylol | 9.20 |  |
| Diacetone Alcohol | 5.20 |  |
| Methyl Ethyl Ketone | 4.60 |  |
| Isophorone | 10.00 |  |
| Methyl Isobutyl Ketone | 1.700 |  |
| Trifunctional, Heat-Hardenable, Phenol-Aldehyde Resinoid Component (Product of Example VIII) | 3.10 | 3.50 |
| Rutile $TiO_2$ | 5.30 | 11.90 |

[1] "SC Solvent 150" is a petroleum aromatic product having 93% aromatics, a mixed aniline point of 70° C., a flash point (Tag closed cup) of 150, a Kauri-Butanol value of 87, a distillation range of 363–415° F., and a specific gravity (60/60° F.) of 0.892. This solvent contains 8% of 1,2,4,5 tetramethylbenzene, 44% of 1,2,3,5 tetramethylbenzene, 6% of 1,2 dialkylbenzene, 19% of 1,3 dialkylbenzene, 15% of 1,4 dialkylbenzene, 6% of 1,2,3 trialkylbenzene, 8% of 1,2,4 trialkylbenzene, 3% of naphthalene and 10% of a mixture of aliphatics.

Examples IV–VI, infra, illustrate suitable single unit liquid coating compositions. In these examples, "Opalon 440" and "Marvinol VR–50" may be substituted for "Bakelite QYNV."

Example IV

|  | Percent By Weight | Percent By Weight Non-Volatile Material |
|---|---|---|
| "Bakelite VMCC" | 8.50 | 15.9 |
| "Bakelite QYNV" | 27.6 | 51.8 |
| "Bakelite ERL-2274" | 1.20 | 2.20 |
| Diisobutyl Ketone | 23.80 |  |
| Diacetone Alcohol | 20.80 |  |
| Trifunctional, Heat-Hardenable, Phenol-Aldehyde Resinoid Component (Product of Example VIII) | 4.10 | 3.80 |
| Pigment ($TiO_2$) | 14.0 | 26.3 |

Example V

|  | Percent By Weight | Percent By Weight Non-Volatile Material |
|---|---|---|
| "Bakelite VMCC" | 0.1 | 18.20 |
| "Bakelite QYNV" | 36.60 | 73.10 |
| "Bakelite ERL-2774" | 1.70 | 3.30 |
| Trifunctional, Heat-Hardenable, Phenol-Aldehyde Resinoid Component (Product of Example VIII) | 5.44 | 5.40 |
| Diacetone Alcohol | 24.08 |  |
| Diisobutyl Ketone | 23.2 |  |

Example VI

|  | Percent By Weight | Percent By Weight Non-Volatile Material |
|---|---|---|
| "Exon 470" | 5.67 | 12.4 |
| "Bakelite VMCH" | 5.68 | 12.4 |
| $TiO_2$ | 11.55 | 25.30 |
| "Bakelite ERL-2774" | 2.70 | 5.90 |
| Isophorone | 11.95 |  |
| Diacetone Alcohol | 1.50 |  |
| Trifunctional, Heat-Hardenable, Phenol-Aldehyde Resinoid Component (Product of Example VII) | 1.50 | 2.40 |
| "Penola 150" [1] | 31.50 |  |
| Butyl Carbitol | 10.45 |  |
| "Bakelite QYNV" | 19.00 | 41.6 |

[1] Product having 94% by volume aromatics (ASTM D 875), a mixed aniline point (° C.) 20, a flash point (Tag closed cup, ° F.) 150, a Kauri-Butanol value of 89.1, and a specific gravity (60/60° F.) of 0.8925.

When a single unit system is used, such as shown in Example VI, supra, "Exon 470" may be used in place of the vinyl chloride-vinyl acetate solution grade copolymer component. Since "Exon 470" does not require the presence of a high level of a ketone type solvent, a single unit system may be prepared therewith that has a negligible build-up in viscosity. On the other hand, once the two units of the two unit system shown above are admixed, the high level of ketone type solvent induces solvation and an increase in viscosity.

Our final liquid coating compositions, such as produced with Examples I–VI, supra, may be applied to metal surfaces by the usual roll coating machines, or it may be applied by simply brushing, spraying or dipping. After the liquid coating is applied, the coated metal should be baked for approximately 2½ minutes to ½ hour at 250°–400° F. We have found that excellent results are obtained when the coated metal is baked for ten minutes at 375° F.

Examples VII–IX, infra, illustrate satisfactory formulations and methods of producing a trifunctional, non-oil-modified, alkaline-condensed, heat-hardenable, phenol-aldehyde resinoid component. Example VIII corresponds with Example VII, except that instead of thinning the phenol-aldehyde resinoid to 75% by weight resin solids, thinning is conducted to obtain 50% by weight resin solids. The procedure set forth in Example IX conforms with the general procedure used in Example VII; however, the charges and pH adjustments of the two examples differed, as described.

Example VII

The following raw materials were placed into a clean stainless steel reactor kettle in the order specified while maintaining agitation:

|  | Lbs. |
|---|---|
| Phenol (90% phenol and 10% $H_2O$) | 632.5 |
| Paraformaldehyde (91–92%) | 301 |
| Distilled water | 249 |

An alkali metal hydroxide or alkaline earth metal hydroxide or amine or phosphate catalyst should be included in the above charge. One may use, for example, 19 lbs. of morpholine, 45 lbs. of 26–28° ammonium hydroxide, 5 lbs. of calcium hydroxide, 17.5 lbs. of C.P. barium hydroxide octahydrate, 1.25 lbs. of sodium hydroxide or 14 lbs. of disodium phosphate.

The above charge was refluxed under 12–14 inches of vacuum at a temperature of 185° F. (a period of 20–30 minutes was required to attain 185° F.) for 70 minutes or to correct bubble viscosity (26 to 30 seconds) determined in accordance with the method set forth in Example X, infra. The batch was then cooled to 75° F.

The pH of the charge was carefully adjusted to a pH of 6.0 to 6.2 by the addition of increments of 50% sulfuric acid (initial additions of 1000 cc. are generally used, and the final increments are adjusted depending upon the rate of change of pH). The pH of the charge was then adjusted to a pH of 3.1 to 3.2 with an organic acid (additions were made by increments as determined by the change in pH). For example, organic acids such as acetic acid, salicylic acid, citric acid, oxalic acid, etc., may be used.

After the final pH adjustment was made, the charge was dehydrated at 185° F. using 28–29 inches of vacuum. The batch was then cooled to 120° F. After cooling was effected, 204 lbs. of diacetone alcohol and 196 lbs. of toluol were added to the charge.

The charge was again dehydrated at 185° F. for 15 to 20 minutes with 28–29 inches vacuum to strip off residual monomer, low molecular weight polymers and residual water, and to obtain a product having resin solids of 75% by weight. The charge was then cooled to 150° F., filtered to remove catalyst residues and other suspended matter and poured into storage drums or tanks.

Example VIII

The same procedure set forth in Example VII, supra, was followed except that further thinning was conducted to obtain the same phenol-aldehyde resinoid having 50% by weight resin solids instead of 75%.

Example IX

The charge of Example VII was replaced with the following:

|  | Lbs. |
|---|---|
| Phenol (90% phenol and 10% water) | 230 |
| Formaldehyde (37%) | 840 |
| Alkaline earth metal hydroxide catalyst (e.g., barium hydroxide) | 22 |

The pH of the charge was adjusted to 6 with $H_2SO_4$ and to 3.2 with an organic acid (see Example VII, supra) after the initial condensation.

Example X, infra, illustrates the method used in determining the bubble viscosity of the trifunctional phenol-aldehyde resinoid charge referred to in Example VII, supra.

Example X

One part by volume of the trifunctional phenol-aldehyde resinoid charge is mixed with one part by volume of a supersaturated sodium chloride solution. The resulting solution is poured into an empty centrifuge tube and the filled tube is centrifuged for two minutes. A calibrated (calibrated against standard tubes) viscosity tube (the viscosity tube is 17.4 cm. long and has a 0.584 cm. inside diameter) is filled with the centrifuged resin, allowing for a ½-inch bubble after a cork stopper is placed in the open end of the tube. The tube and resin are conditioned to a temperature of 80° F., after which one should determine the time, in seconds, required for the bubble to rise the length of the vertical position tube.

The term "formaldehyde" in the following claims is intended to include compounds that yield formaldehyde in the prescribed levels.

The foregoing detailed description has been given for clearness of understanding only, and no unnecessary limitations should be understood therefrom, as modifications will be obvious to those skilled in the art.

We claim:

1. A liquid coating composition suitable for use in lining metallic containers and container parts and closures when applied on the metal surfaces thereof and baked thereon, which comprises: (1) a solution grade vinyl chloride copolymer from the group consisting of (a) vinyl chloride and vinyl acetate, (b) vinyl chloride and lower alkyl maleate, and (c) admixtures of (a) and (b), (2) a non-oil-modified, alkaline-condensed, heat-hardenable, phenol-aldehyde resinoid component comprising the reaction product of co-condensation of about 1-4 parts by weight formaldehyde and about 1 part by weight non-substituted trifunctional phenol, (3) an organosol component having a vinyl chloride homopolymer dispersion resin dispersed in an organic liquid vehicle, and (4) an organic liquid vehicle; said composition containing about 35-70% by weight non-volatiles, which comprise about 5-35 parts by weight vinyl chloride solution grade copolymer, about 0.5-20 parts by weight phenol-aldehyde resinoid, and about 10-50 parts by weight vinyl chloride homopolymer.

2. The composition of claim 1 wherein the vinyl chloride copolymer is vinyl chloride-vinyl acetate.

3. A liquid coating composition suitable for use in lining metallic containers and container parts and closures when applied on the metal surfaces thereof and baked thereon, which comprises: (1) a solution grade vinyl chloride copolymer from the group consisting of (a) vinyl chloride and vinyl acetate, (b) vinyl chloride and lower alkyl maleate, and (c) admixtures of (a) and (b), (2) a non-oil-modified, alkaline-condensed, heat-hardenable, phenol-aldehyde resinoid component comprising the reaction product of co-condensation of about 1-4 parts by weight formaldehyde and about 1 part by weight non-substituted trifunctional phenol, (3) an organosol component containing a vinyl chloride homopolymer dispersion resin dispersed in an organic liquid vehicle with a heat-stabilizer, and (4) an organic liquid vehicle; said liquid coating composition containing about 35-70% by weight non-volatiles, said liquid coating composition comprising about 5-35% by weight vinyl chloride solution grade copolymer, about 0.5-20% by weight phenol-aldehyde resinoid, and about 10-50% by weight vinyl chloride homopolymer.

4. The composition of claim 3 wherein the vinyl chloride copolymer is vinyl chloride-vinyl acetate.

5. A liquid coating composition suitable for use in lining metallic containers and container parts and closures when applied on the metal surfaces thereof and baked thereon, which comprises: (1) a solution grade vinyl chloride copolymer from the group consisting of (a) vinyl chloride and vinyl acetate, (b) vinyl chloride and lower alkyl maleate, and (c) admixtures of (a) and (b), (2) a non-oil-modified, alkaline-condensed, heat-hardenable, phenol-aldehyde resinoid component comprising the reaction product of co-condensation of about 1-4 parts by weight formaldehyde and about 1 part by weight non-substituted trifunctional phenol (3) a heat-stabilized organosol component containing a vinyl chloride homopolymer dispersion resin dispersed in an organic liquid vehicle with a heat stabilizing agent, and (4) an organic liquid vehicle; said composition containing about 35-70% by weight non-volatiles, which comprise about 8-15 parts by weight vinyl chloride solution grade copolymer, about 1-5 parts by weight phenol-aldehyde resinoid, and about 15-40 parts by weight vinyl chloride homopolymer.

6. The composition of claim 5 wherein the vinyl chloride copolymer is vinyl chloride-vinyl acetate.

7. A liquid coating composition suitable for use in lining metallic containers and container parts and closures when applied on the metal surfaces thereof and baked thereon, which comprises: (1) a solution grade vinyl chloride copolymer from the group consisting of (a) vinyl chloride and vinyl acetate, (b) vinyl chloride and lower alkyl maleate, and (c) admixtures of (a) and (b), (2) a non-oil-modified, alkaline-condensed, heat-hardenable, phenol-aldehyde resinoid component comprising the reaction product of co-condensation of about 1.5-3 parts by weight formaldehyde and about 1 part by weight non-substituted trifunctional phenol, (3) a heat-stabilized organosol component containing a vinyl chloride homopolymer dispersion resin dispersed in an organic liquid vehicle with a heat stabilizing agent, and (4) an organic liquid vehicle; said composition containing about 40-70% by weight non-volatiles, which comprise about 8-15 parts by weight vinyl chloride solution grade copolymer, about 1-5 parts by weight phenol-aldehyde resinoid, and about 15-40 parts by weight vinyl chloride homopolymer.

8. A liquid coating composition suitable for use in lining metallic containers and container parts and closures when applied on the metal surfaces thereof and baked thereon, which comprises: (1) a solution grade vinyl chloride copolymer from the group consisting of (a) vinyl chloride and vinyl acetate, (b) vinyl chloride and lower alkyl maleate, and (c) admixtures of (a) and (b), (2) a non-oil-modified, alkaline-condensed, heat-hardenable, phenol-aldehyde resinoid component comprising the reaction product of co-condensation of about 1-4 parts by weight formaldehyde and about 1 part by weight nonsubstituted trifunctional phenol, (3) a heat-stabilized organosol component having a vinyl chloride homopolymer dispersion resin dispersed with a heat stabilizer in an organic liquid vehicle, and (4) an organic liquid vehicle; said composition containing about 35-70% by weight non-volatiles, which comprise about 8-12 parts by weight vinyl chloride solution grade copolymer, about 1-3 parts by weight phenol-aldehyde resinoid, and about 17–37 parts by weight vinyl chloride homopolymer.

9. The composition of claim 8 wherein the vinyl chloride copolymer is vinyl chloride-vinyl acetate.

10. A metal article whose surface is provided with a stable baked-on coating composition, which comprises: the baked-on product produced by baking a liquid coating composition containing (1) a solution grade vinyl chloride copolymer from the group consisting of (*a*) vinyl chloride and vinyl acetate, (*b*) vinyl chloride and lower alkyl maleate, and (*c*) admixtures of (*a*) and (*b*), (2) a non-oil-modified, alkaline-condensed, heat-hardenable, phenol-aldehyde resinoid component comprising the reaction product of co-condensation of about 1–4 parts by weight formaldehyde and about 1 part by weight nonsubstituted trifunctional phenol, (3) an organosol component having a vinyl chloride homopolymer dispersion resin dispersed in an organic liquid vehicle, and (4) an organic liquid vehicle; said liquid composition containing about 35–70% by weight non-volatiles, which comprise about 5–35 parts by weight vinyl chloride solution grade copolymer, about 0.5–20 parts by weight phenol-aldehyde resinoid, and about 10–50 parts by weight vinyl chloride homopolymer.

11. The article of claim 10 wherein the vinyl chloride copolymer component of the coating composition is vinyl chloride-vinyl acetate.

12. A metal article whose surface is provided with a stable baked-on coating composition, which comprises: the baked-on product produced by baking a liquid coating composition containing (1) a solution grade vinyl chloride copolymer from the group consisting of (*a*) vinyl chloride and vinyl acetate, (*b*) vinyl chloride and lower alkyl maleate, and (*c*) admixtures of (*a*) and (*b*), (2) a non-oil-modified, alkaline-condensed, heat-hardenable, phenol-aldehyde resinoid component comprising the reaction product of co-condensation of about 1–4 parts by weight formaldehyde and about 1 part by weight nonsubstituted trifunctional phenol, (3) a heat-stabilized organosol component containing a vinyl chloride homopolymer dispersion resin dispersed in an organic liquid vehicle with a heat stabilizer, and (4) an organic liquid vehicle; said liquid composition containing about 35–70% by weight non-volatiles, which comprise about 5–35 parts by weight vinyl chloride solution grade copolymer, about 0.5–20 parts by weight phenol-aldehyde resinoid, and about 10–50 parts by weight vinyl chloride homopolymer.

13. A metal article whose surface is provided with a stable baked-on coating composition, which comprises: a baked-on product produced by baking a liquid coating composition containing (1) a solution grade vinyl chloride copolymer from the group consisting of (*a*) vinyl chloride and vinyl acetate, (*b*) vinyl chloride and lower alkyl maleate, and (*c*) admixtures of (*a*) and (*b*), (2) a non-oil-modified, alkaline-condensed, heat-hardenable, phenol-aldehyde resinoid component comprising the reaction product of co-condensation of about 1–4 parts by weight formaldehyde and about 1 part by weight nonsubstituted trifunctional phenol, (3) a heat-stabilized organsol component containing a vinyl chloride homopolymer dispersion resin dispersed in an organic liquid vehicle with a heat stabilizer, and (4) an organic liquid vehicle; said liquid composition containing about 35–70% by weight non-volatiles, which comprise about 8–15 parts by weight vinyl chloride solution grade copolymer, about 1–5 parts by weight phenol-aldehyde resinoid, and about 15–40 parts by weight vinyl chloride homopolymer.

No references cited.

UNITED STATES PATENT OFFICE
CERTIFICATE OF CORRECTION

Patent No. 3,114,725                        December 17, 1963

Herbert A. Kaufman, Jr., et al.

It is hereby certified that error appears in the above numbered patent requiring correction and that the said Letters Patent should read as corrected below.

Column 3, line 17, for "serves" read -- serve --; column 4, line 16, for "($N_D{}^{25°}$)" read -- ($N_D^{25°}$) --; column 7, Example III, line 6 of the footnote thereto, for "19% of 1,3 dialkylbenzene" read -- 10% of 1,3,dialkylbenzene --.

Signed and sealed this 16th day of June 1964.

(SEAL)
Attest:

ERNEST W. SWIDER
Attesting Officer

EDWARD J. BRENNER
Commissioner of Patents